United States Statutory Invention Registration [19]

[11] Reg. Number: H804

Dobbins [43] Published: Aug. 7, 1990

[54] QUICK-CONNECT COUPLER FOR REMOTE MANIPULATION

[75] Inventor: James C. Dobbins, Idaho Falls, Id.

[73] Assignee: The United States of America as represented by the United States Department of Energy, Washington, D.C.

[21] Appl. No.: 385,519

[22] Filed: Jul. 27, 1989

[51] Int. Cl.[5] ..... F16L 37/02
[52] U.S. Cl. ..... 285/345

*Primary Examiner*—Charles T. Jordan
*Assistant Examiner*—Michael Carone
*Attorney, Agent, or Firm*—Helen S. Cordell; John M. Albrecht; William R. Moser

[57] ABSTRACT

An adaptor for a single-point attachment, push-to-connect/pull-to-disconnect, quick-connect fluid coupler which enables the coupler to be remotely manipulated.

9 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

QUICK-CONNECT COUPLER FOR REMOTE MANIPULATION

CONTRACTUAL ORIGIN OF THE INVENTION

The U.S. Government has rights in this invention pursuant to Contract No. DE-AC07-84ID12435 between the U.S. Department of Energy and Westinghouse Electric Co.

BACKGROUND OF THE INVENTION

This invention relates to a quick-connect fluid coupler adapted for remote manipulation by master-slave or electromechanical manipulation, and in particular to a remotely manipulable adapter which can be fitted to a single-point push-to-connect/pull-to-disconnect fluid coupler without modifying the coupler or otherwise damaging or destroying its components.

Quick-connect fluid couplers known to the prior art are generally structured to enable ready coupling and uncoupling of a coupler pair by way of an interlocking means for the coupler bodies, and a releasing device responsive to push/pull and gripping motions. Of the couplers known in the prior art, single-point attachment, push-to-connect/pull to disconnect couplers are most useful in environments requiring remote manipulation because the coupler is gripped and moved in the direction of making up or breaking the connection.

There are, however, numerous difficulties associated with connecting and disconnecting quick-connect fluid couplers by remote manipulation. The most notable difficulty is that precise position and alignment are required to make up the connection, and without good visibility, depth perception, and tactile feedback, numerous attempts may be required to accomplish the operation.

Also, because quick-connect couplers are basically designed to be operated by human hands, gripping points may be too small, inaccessible, or smooth for use with master/slave or electromechanical manipulators. Or, operation of the quick-connect coupler may presuppose use of two hands, where only one is available.

It is therefore a primary object of this invention to provide a quick-connect fluid coupler adapted for remote manipulation by master-slave or electromechanical manipulation.

In the accomplishment of the foregoing object, it is another important object of this invention to provide a quick-connect fluid coupler which is of simple manufacturing design and can be constructed without modifications to the coupler components, eliminating potential for damage such as weld distortion.

It is another important object of this invention to provide a quick-connect coupler which is self-aligning and can be operated remotely in both vertical and horizontal configurations.

It is a further object of this invention to present a quick-connect coupler which is not only remotely operable but also remotely installable and removable.

A yet further object of the present invention is to present a quick-connect coupler in which internal moving parts are sealed against damage by the surrounding environment.

Additional objects, advantages and novel features of the invention will become apparent to those skilled in the art upon examination of the following and by practice of the invention.

SUMMARY OF THE INVENTION

To achieve the foregoing and other objects, this invention comprises an adaptor for a single-point attachment, push-to-connect/pull-to-disconnect, quick-connect fluid coupler which enables the coupler to be remotely manipulated. The coupler for which the adapter is designed is any of a number known to the prior art comprised of a coupler body with male or female interlocking means and a releasing mechanism, designated here as the removable coupler body, and a coupler body with complementary male or female interlocking means without a release mechanism, designated here as the stationary coupler body.

The adaptor of the current invention comprises a housing surrounding and adapted to engage respectively the moveable release mechanism on the removable coupler body and the shank of the removable coupler body, a guide encircling the stationary coupler body providing a receptacle into which the housing is pushed during connection, and remotely manipulable interfaces projecting from the exterior of the housing and guide.

More particularly, during connection a housing surrounding the removable coupler body abuts a collar fixed to the removable coupler body, so that a pushing motion on the housing is transferred to the removable coupler body and the removable coupler body is urged to its interlocked or connected position with the stationary coupler body. During disconnection the housing engages the moveable release mechanism, so that a pulling motion on the housing is transferred to the release mechanism, the release mechanism is moved to its unlocking position, and the removable coupler body is urged to its disconnected position.

A guide encircling the stationary coupler body provides a receptacle for the housing which surrounds the removable coupler body, and acts to align the removable coupler body with the stationary coupler body during connection. In various embodiments of the present invention, interfaces of various design project from the exterior of the housing and guide, enabling remote manipulation by devices known to the prior art, including master-slave manipulators and electromechanical manipulators.

BRIEF DESCRIPTION OF THE DRAWINGS

The present invention is illustrated in the accompanying drawings where.

DETAILED DESCRIPTION OF THE INVENTION

Figure 1:
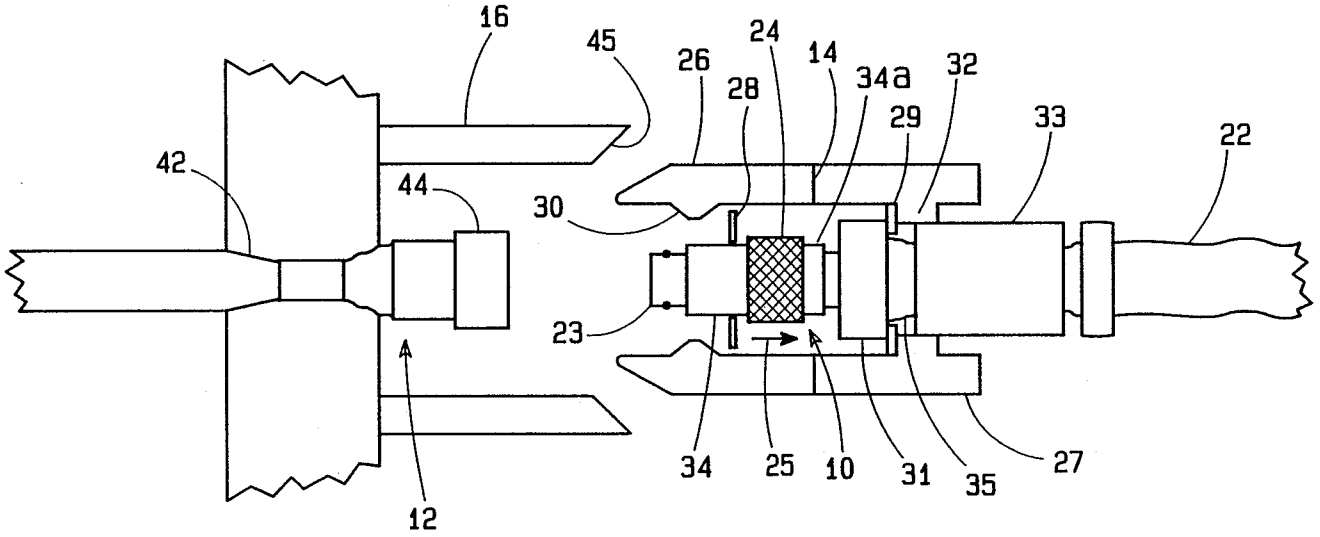
FIG. 1 is a cross-sectional view of a quick-disconnect coupler embodying the principles of this invention showing the removable and stationary coupler bodies adapted for remote manipulation.

Referring now more in detail to the drawings and having reference first to FIG. 1, which shows the main parts of the invention in a cross-sectional view, the quick-connect fluid coupler comprises a removable coupler body indicated generally by the arrow 10, a stationary coupler body indicated generally by the arrow 12, a housing 14 surrounding the removable coupler body 10, and a guide 16 encircling the stationary coupler body 12.

This embodiment of the invention incorporates a 700 Series quick disconnect coupling pair (stationary coupler body and removable coupler body) manufactured by Flo-Lok, Inc., but those skilled in the art will recognize that the invention is not limited to components of any specific manufacturer.

The removable coupler body 10 is adapted to be coupled to a hose 22 and is comprised of a nipple 23, a release mechanism 24, a shank 34, a collar 31, and a shank extension 35. The moveable release mechanism 24 comprises a collar which encircles the shank 34 and is knurled to serve as a gripping point during hand manipulation. Normally the release mechanism 24 assumes the connected position shown in FIG. 1; when pressure is applied in the direction indicated by the arrow 25 the release mechanism 24 slides axially on the shank 34 to a disconnecting position.

The housing 14 surrounding the removable coupler body 10 is comprised of a nose 26, a tail 27, a front ring 28 and a rear ring 29. The housing nose 26 is cylindrical. The removable coupler body 10 is mounted axially within the nose 26 by means of the front ring 28. Within the housing nose 26 is a front shoulder 30 which serves as a stop for the front ring 28.

During assembly of the housing nose 26 with the removable coupler body 10, the nipple 23 is inserted into the front ring 28 until the front ring 28 butts against the release mechanism 24. In this embodiment the front ring 28 is a washer approximately 0.050 in. thick, and when the front ring 28 butts against the release mechanism 24 there is 0.007 in. diametrical clearance between the front ring 28 and the shank 34. Next, the nipple 23, the encircling front ring 28, the release mechanism 24 and the shank 34 are inserted into the housing nose 26, with the nipple 23 proceeding first, from the rear to the front of the housing nose 26 (the front of the housing nose 26 being that end which is closer to the front shoulder 30). In this embodiment there is approximately 0.006 to 0.012 in. diametrical clearance between the outer dimension of the front ring 28 and the inside diameter of the housing nose 26.

The surface of the front shoulder 30 nearer the front ring 28 is tapered, so that the front ring 28 will automatically center in the housing nose 28 after assembly. A taper on the end of the housing nose 26 will also assist in insertion of the nose 26 into the guide 16 during remote operation.

The tail 27 is cylindrical. The removable coupler body 10 is mounted axially within the tail 27 by means of the rear ring 29. Within the housing tail 27 is a rear shoulder 32 which serves as a stop for the rear ring 29.

During assembly of the housing tail 27 with the removable coupler body 10, a collar 31 is attached to the shank 34 by threaded means (not shown) and a shank extension 35 is fitted to the collar 31 by threaded means (not shown). The rear ring 29 (in this embodiment, a washer approximately 0.050 in. thick) is placed on the shank extension 35, encircling the shank extension 35 and abutting the collar 31. The housing tail 27 is moved over the shank extension 35, then over the rear ring 29, and then over the collar 31, with the front end of the housing tail 27 proceeding first (the front end of the housing tail 27 being the end farther away from the rear shoulder 32), until the rear shoulder 32 within the tail 27 abuts the rear ring 29. As a result the housing 14 encircles the removable coupler body 10. It is preferable that the removable coupler body 10 projects beyond the end of the tail 27 to allow the pipe coupling 33 and hose 22 to be attached, which is the next step in assembly of the housing 14.

Assembly of the housing 14 is completed by fixing the nose 26 to the tail 27. The joint can be designed for attachment using any of a number of techniques, such as welding, threading, bolting, press-fitting or bayoneting.

The stationary coupler body 12 is adapted to be coupled to a pipe 42 and is formed with a sleeve 44 for receiving the nipple 23 with a plug-in or slip-on fit.

The stationary coupler body 12 in this embodiment is encircled by guide 16, which is a hollow cylindrical tube with a tapered lead-in 45. The guide 16 is concentric with the stationary coupler body 12 and serves to center and to guide the housing 14 into place during connection, and to provide some structural protection of the joint.

Figure 2:
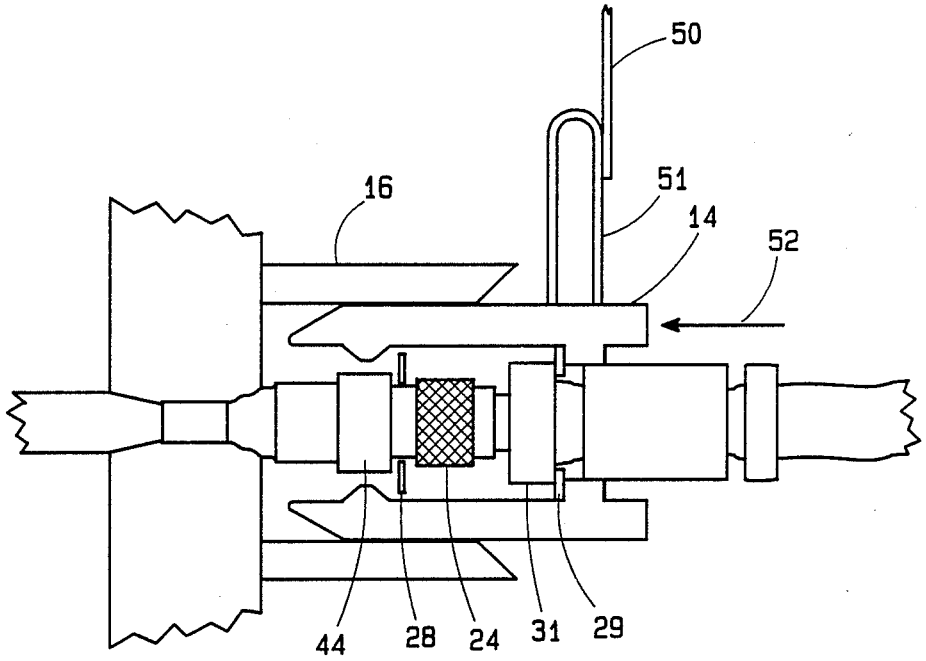
FIG. 2 is a cross-sectional view depicting the method of connecting the quick-disconnect coupler, showing the housing engaging the rear ring and pushing the collar and the removable coupler body until it is interlocked with the stationary coupler body.
Figure 3:
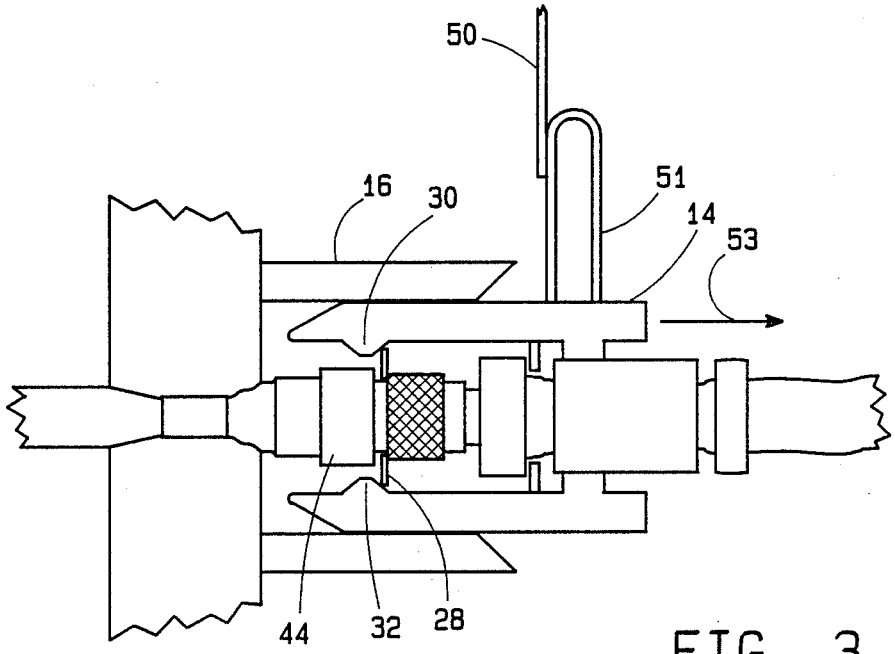
FIG. 3 is a cross-sectional view depicting the method of disconnecting the quick-disconnect coupler, showing the housing engaging the front ring, causing the release mechanism to slide, unlocking the coupling.

Using the invention the following operations depicted in FIGS. 2 and 3 are obtainable:

Referring to FIG. 2, to couple or connect the coupler bodies the housing 14 is gripped by the remote manipulator 50 by means of an interface 51. In this embodiment an electromechanical manipulator interfaces with the housing by means of a bail. The housing 14 is pushed in the direction of the arrow 52 into the guide 16. The rear ring 29 pushes the collar 31, and the nipple (shown more clearly in FIG. 1) enters the sleeve 44, causing the release mechanism 24 to slide back until the nipple is fully engaged in the sleeve 44, at which point the remote manipulator is backed off of interface 51, the release mechanism 24 slides back into its connected position, and the quick-connect coupler is locked. Pulling on the hose 22 will not break the connection.

Referring to FIG. 3, to uncouple or disconnect the coupler bodies the remote manipulator 50 pulls on the interface 51 and the housing 14 is pulled in the direction of the arrow 53. The front shoulder 30 engages and pushes on the front ring 28, and the front ring 28 abuts the release mechanism 24, causing the release mechanism 24 to slide in the direction of arrow 53, unlocking the coupler. After the nipple (shown in FIG. 1) is fully disengaged from the sleeve 44 the remote manipulator is backed off of interface 51 and the release mechanism 24 slides back into its rest position.

Figure 4:
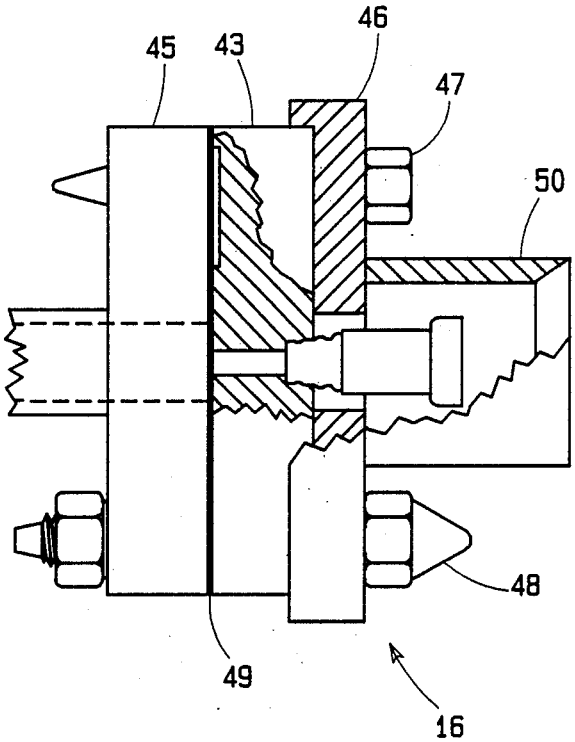
FIG. 4 is a fragmentary, cross sectional view of another embodiment of the invention, showing a guide encircling a stationary coupler body. The guide has been mounted on the flange by means of remote manipulation, using standard remote bolts which allow remote replacement of the stationary coupler body and guide.

FIG. 4 is a fragmentary, cross-sectional view of another embodiment of the invention, showing a guide 16 mounted on a permanently fixed flange 45. Installation and removal of the guide 16 may be accomplished using remote manipulators known to the prior art.

Guide 16 is comprised of a removable flange 43, a guide plate 46, and a tube 50. Tube 50 has been fixedly attached to guide plate 46 such as by welding. Guide plate 46 is centered over the outside diameter of the removable flange 43, which is held in place by a guide pin 47 threaded into the removable flange 43. The guide plate 46 and removable flange 43 are mounted to the fixed flange 45, by means of standard remote bolts 48. A Grafoil gasket 49 between the fixed flange 45 and the removable flange 43 provides a pressure seal when the remote bolts 48 are tightened.

Figure 5:
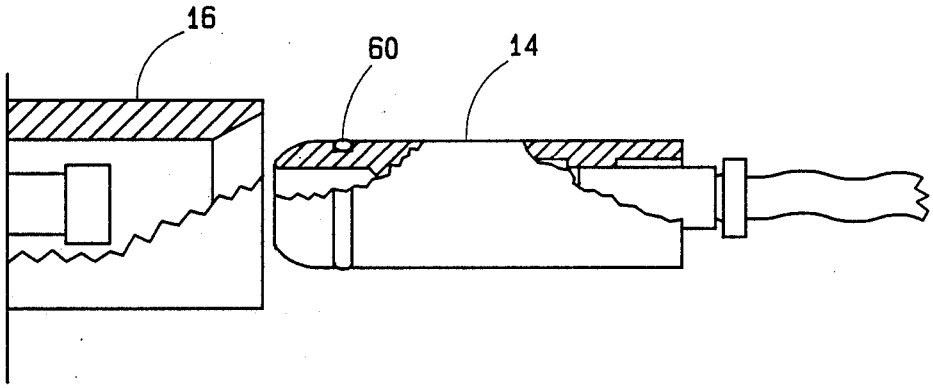
FIG. 5 is a fragmentary, cross-sectional view of another embodiment of the invention, in which an o-ring encircles the housing and provides a seal between the housing and the guide, thereby protecting the coupler's internal moving parts against abrasive and/or chemical elements which may be found in the surrounding environment.

FIG. 5 is a fragmentary, cross-sectional view of another embodiment of the invention, in which an o-ring 60 fits in a recessed groove and encircles the exterior of the housing 14. When the housing 14 is inserted into the guide 16 the o-ring 60 engages the interior surface of guide 16 and seals the coupler's internal moving parts against sprays, fluids, or contaminants which may exist in the surrounding environment.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. It is intended that the scope of the invention be defined by the claims appended hereto.

The embodiments of this invention in which an exclusive property or privilege is claimed are defined as follows:

1. A quick-connect fluid coupler comprised of a removable coupler body with interlocking means with a push-to-connect/pull-to-disconnect release mechanism, and a stationary coupler body with complementary interlocking means without a release mechanism, adapted to permit connection and disconnection by remote manipulation, comprising:

a housing surrounding said removable coupler body, abutment means engaging portions of said removable coupler body, transferring the motion of said housing to said removable coupler body, comprising two or more detachable rings encircling said removable coupler body, and remote manipulator interfaces projecting from the exterior surfaces of said housing.

2. The quick-connect fluid coupler of claim 1, wherein said housing includes guide means to assist in mating said removable coupler body with said stationary coupler body.

3. The quick-connect fluid coupler of claim 1, comprising as well, a guide encircling the stationary coupler body of said quick-connect hose coupler, providing a receptacle into which said housing and said removable coupler body arc pushed during connection.

4. The quick-connect fluid coupler of claim 1, wherein said interlocking means of said removable coupler body is a male interlocking means and said interlocking means of said stationary coupler body is a female interlocking means.

5. The quick-connect fluid coupler of claim 1, wherein said interlocking means of said removable coupler body is a female interlocking means and said interlocking means of said stationary coupler body is a male interlocking means.

6. The quick-connect fluid coupler of claim 1, wherein said housing is cylindrical with a concentric hole passing through it and with shoulders extending inward and abutting said rings encircling said removable coupler body and said quick release mechanism.

7. The quick-connect fluid coupler of claim 1, wherein said housing comprises nose and tail pieces which are joined during assembly of said adapter on said quick-connect hose coupler.

8. The quick-connect fluid coupler of claim 7, wherein said nose and tail pieces are joined by a method selected from the group including welding, threading, bolting, press-fitting or bayoneting.

9. The quick-connect fluid coupler of claim 1, wherein said housing includes sealing means providing a barrier between internal moving parts and the environment.

* * * * *